US011891900B2

(12) United States Patent
Sarbanis

(10) Patent No.: US 11,891,900 B2
(45) Date of Patent: Feb. 6, 2024

(54) OVER-ACCELERATION PROTECTION DEVICE FOR A SPEED REGULATOR INTERNAL COMBUSTION ENGINES AND TURBINES

(71) Applicant: Lampros Sarbanis, Attikis (GR)

(72) Inventor: Lampros Sarbanis, Attikis (GR)

( * ) Notice: Subject to any disclaimer, the term of this patent is extended or adjusted under 35 U.S.C. 154(b) by 164 days.

(21) Appl. No.: 17/426,163

(22) PCT Filed: Oct. 31, 2019

(86) PCT No.: PCT/GR2019/000074

§ 371 (c)(1),
(2) Date: Jul. 28, 2021

(87) PCT Pub. No.: WO2020/165612

PCT Pub. Date: Aug. 20, 2020

(65) Prior Publication Data

US 2022/0106890 A1 Apr. 7, 2022

(30) Foreign Application Priority Data

Feb. 11, 2019 (GR) .............................. 20190100069

(51) Int. Cl.

| | |
|---|---|
| ***B60K 1/00*** | (2006.01) |
| ***F01D 17/06*** | (2006.01) |
| ***F01D 17/20*** | (2006.01) |
| ***F01D 21/02*** | (2006.01) |
| ***F02D 1/04*** | (2006.01) |
| ***F02D 1/10*** | (2006.01) |
| ***F02M 41/12*** | (2006.01) |

(52) U.S. Cl.
CPC ........... *F01D 17/06* (2013.01); *F01D 17/205* (2013.01); *F01D 21/02* (2013.01); *F02D 1/04* (2013.01); *F02D 1/10* (2013.01); *F02M 41/126* (2013.01); *F05D 2270/021* (2013.01)

(58) Field of Classification Search
CPC ........ F01D 17/06; F01D 17/205; F01D 21/02; F02D 1/04; F02D 1/10; F02M 41/126
See application file for complete search history.

(56) References Cited

U.S. PATENT DOCUMENTS

| | | | | |
|---|---|---|---|---|
| 4,400,996 | A * | 8/1983 | Schou | F16D 41/22 475/241 |
| 4,716,723 | A * | 1/1988 | Ralston | F02C 9/28 60/39.281 |
| 10,065,489 | B2 * | 9/2018 | Wang | F16H 48/36 |

* cited by examiner

*Primary Examiner* — Gonzalo Laguarda

(57) ABSTRACT

Over-acceleration protection mechanism for ICE or turbine speed regulator with a bushing driven by the gears. The bushing, the component, the washer, the thread, are joined together. The component screws to the thread through the thread. The weights are fitted to the component through the pins and the safety clips, including the valve which is secured by the nut. The lid is screwed to the bushing by means of the screws, while the counterweights come out of the openings of the lid. The thrust bearing and the pressure spring are mounted on the component, adjusted by the screw. The device operates through the centrifugal force which forces the counterweights to rotate in its direction of rotation and to displace the valve by compressing the spring. Then the holes of the fittings communicate with each other, allowing the oil to pass through the joints and the tube and actuate the system.

9 Claims, 9 Drawing Sheets

OVER-ACCELERATION PROTECTION DEVICE FOR A SPEED REGULATOR INTERNAL COMBUSTION ENGINES AND TURBINES

BACKGROUND OF INVENTION

This invention relates to the manufacture of an over-acceleration protection device for a speed regulator that controls the operation of an internal combustion engine (ICE) or a turbine. The speed regulator, during its use so far, controls the supply power amount to ICEs or turbines. Specifically, it controls the fuel and steam entering ICEs and steam turbines, respectively. The mode of operation of a speed regulator ensures complete control of the input energy and therefore the revolutions of ICEs or steam turbines/turbines, provided that it is connected to the power carrier such as the ICE oil pumps or the steam turbine/turbine steam/fuel valve as specified by the manufacturer's instructions. The principle of operation of speed regulator is based on the phenomenon of centrifugal force. It has internally a system of counterweights which rotate during its operation, tending to move to the periphery of the imaginary circle of rotation, away from its centre. Thus, due to their construction design and the way they are connected, when the counterweights tend to move to the circumference of their imaginary circle of rotation, another part of them generates an imaginary straight movement from the bottom up. A plunger connected to the segment moving in straight line controls the flow of the pressurized oil to the piston which moves the terminal shaft of the speed regulator through some diodes which it opens or closes. Thus, as the ICE or steam turbine rotation speed increases, the weights tend to move to the circumference of the circle as mentioned above, thereby lifting the plunger attached to them. As a result, the piston connected to the terminal shaft moves to zero due to discharge of oil through the plunger to the speed regulator oil pan, thereby reducing the supplied power and, thus, the revolutions of the ICE or steam turbine. On the contrary, when the rotation speed of the ICE or steam turbine is reduced, the weights tend to move towards the centre of the circle under the action of the revolution regulating spring, thereby lowering the plunger attached to them. This in turn directs the pressurized oil to the piston that moves the terminal shaft to the increase position, causing increase of the ICE or steam turbine input power and, thus, their revolutions. If the oil pumps or the steam valve as mentioned above are not in good condition or the speed regulator connection thereto is incorrectly made, it is possible that the ICEs or steam turbines are uncontrollably supplied with fuel and steam respectively, this resulting in an over-acceleration state. This is a very dangerous event in which, as denoted by the word, the ICE or the turbine uncontrollably accelerates causing both wear and tear or damage to their components and potentially injuring people who may be around at the moment. Since its inception, this type of speed regulator has the disadvantage of not being able to protect the ICE or the turbine when they come to over-acceleration because it does not have an additional protection system to cut off the power supply of whatever form immediately.

FIELD OF INVENTION

The present invention is intended to provide a device consisting of various components which can be connected and cooperate with one another to provide protection to the user in the event that the ICE or turbine is moving to an over-accelerated state. This device also enables the user to adjust the over-acceleration speed over which the protection device will be activated, so that it can cover all different manufacturing companies and all ICE or turbine models used.

The advantages of the present invention are that because of the power cut-off to the ICE or the turbine or any other type of engine, there is an immediate operation shutdown thereof, protecting both the people around the machine from possible injury and the engine or the turbine itself from suffering damage.

BRIEF DESCRIPTION OF THE DRAWINGS

The present invention can be fully understood from the following detailed description with reference to the accompanying drawings. Specifically.

Figure 2:
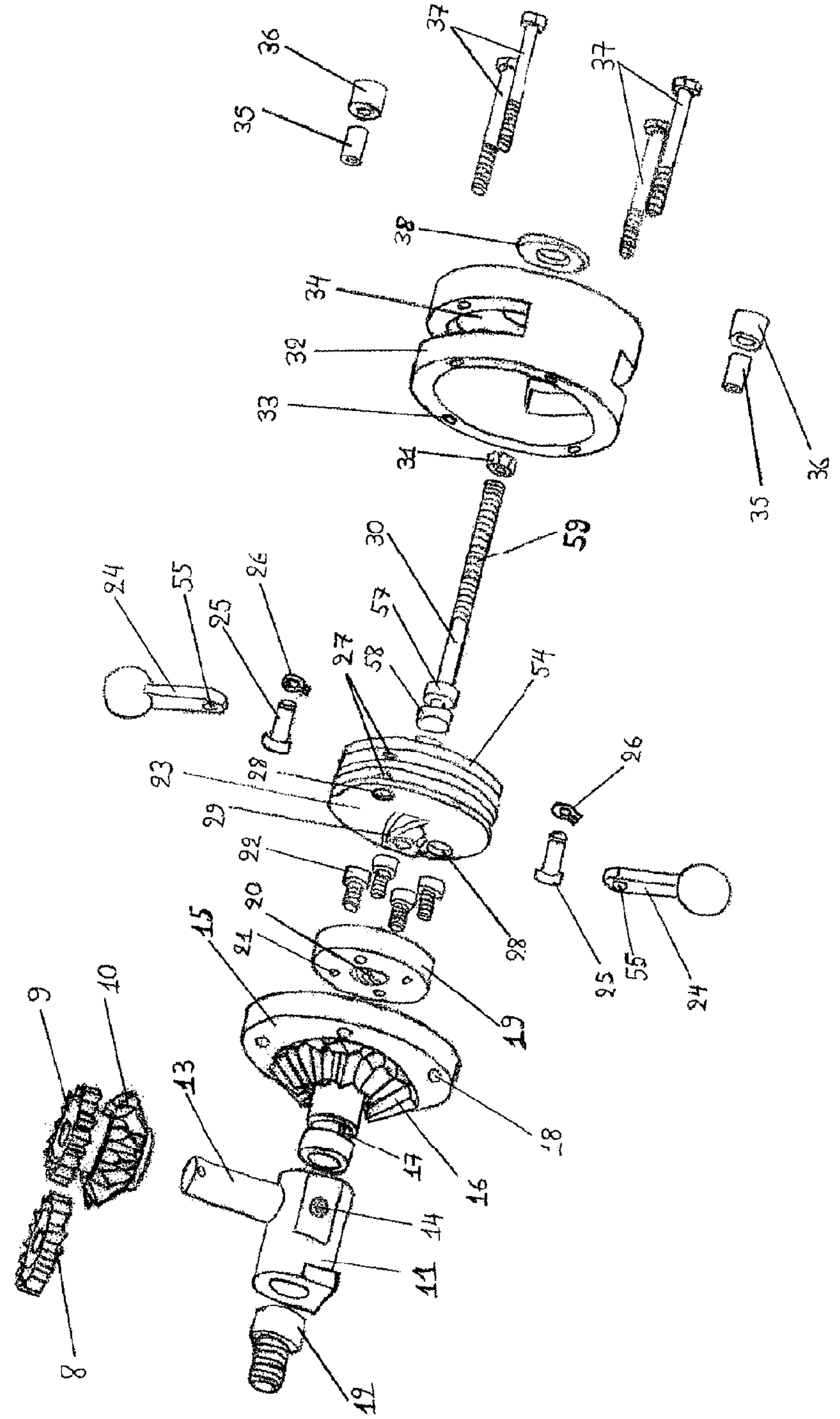
FIG. 2 shows an expanded perspective view of the components which can be connected and cooperate with each other to create the over-acceleration protection device.
Figure 3:
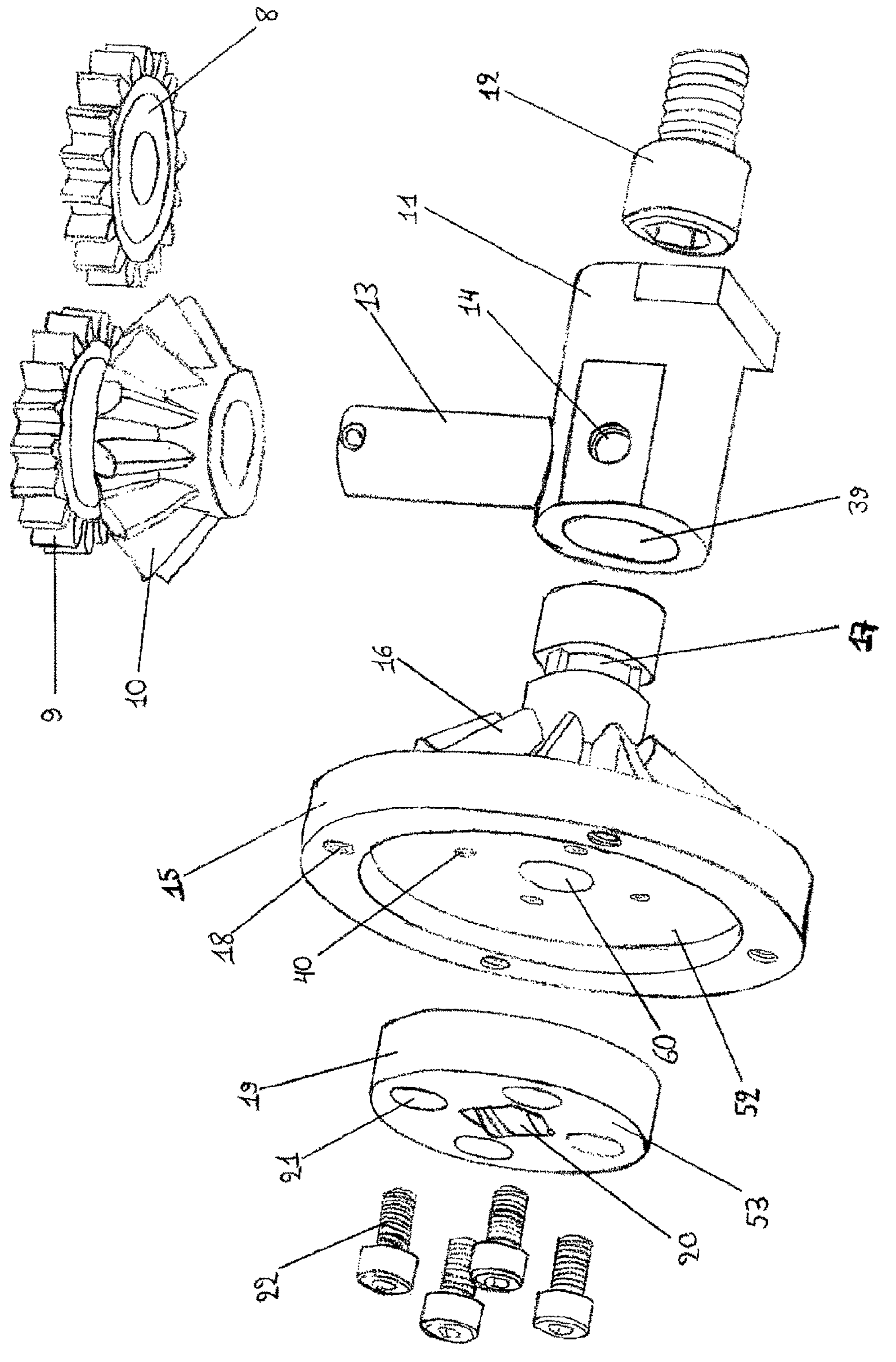
Figure 4:
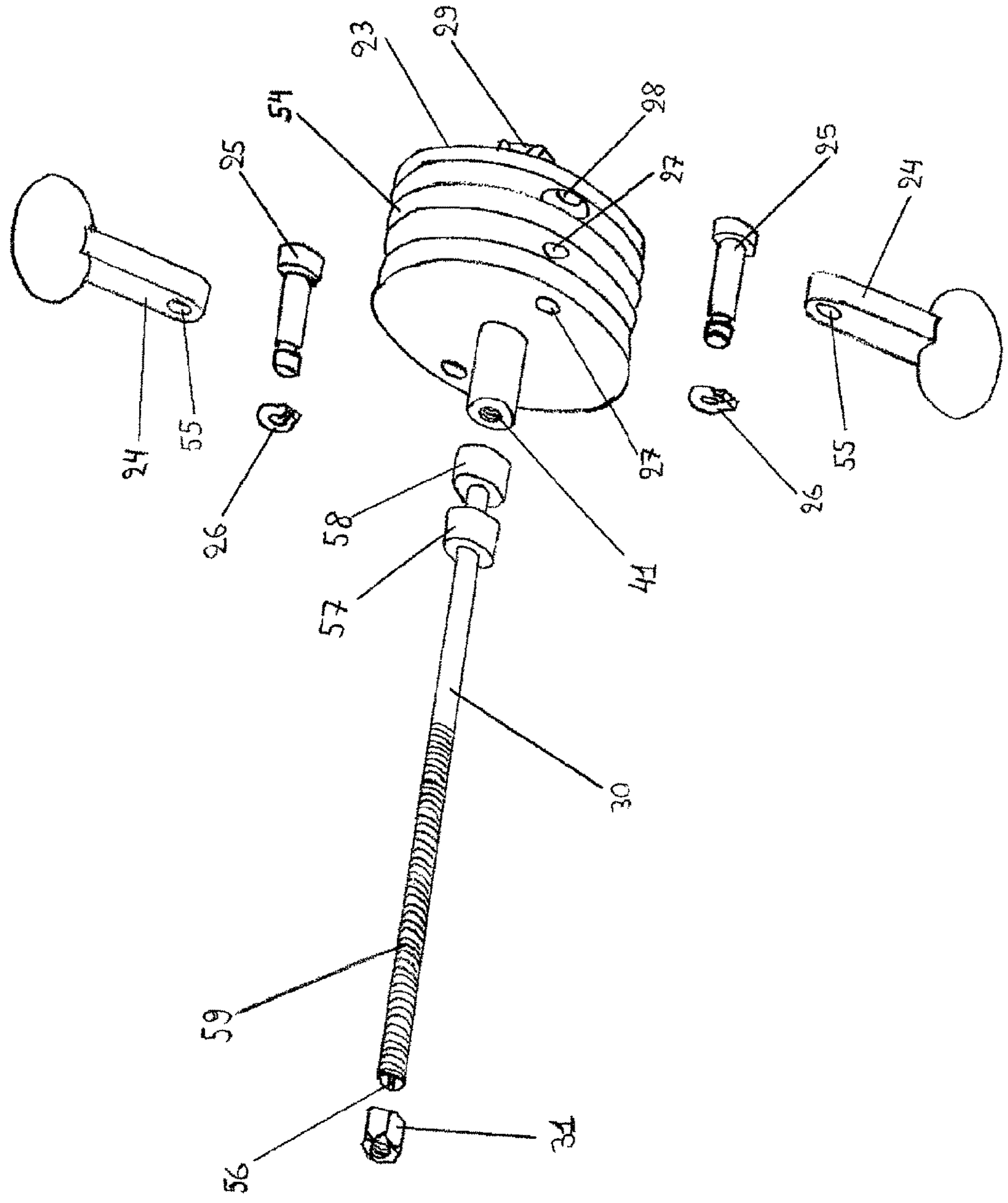
Figure 5:
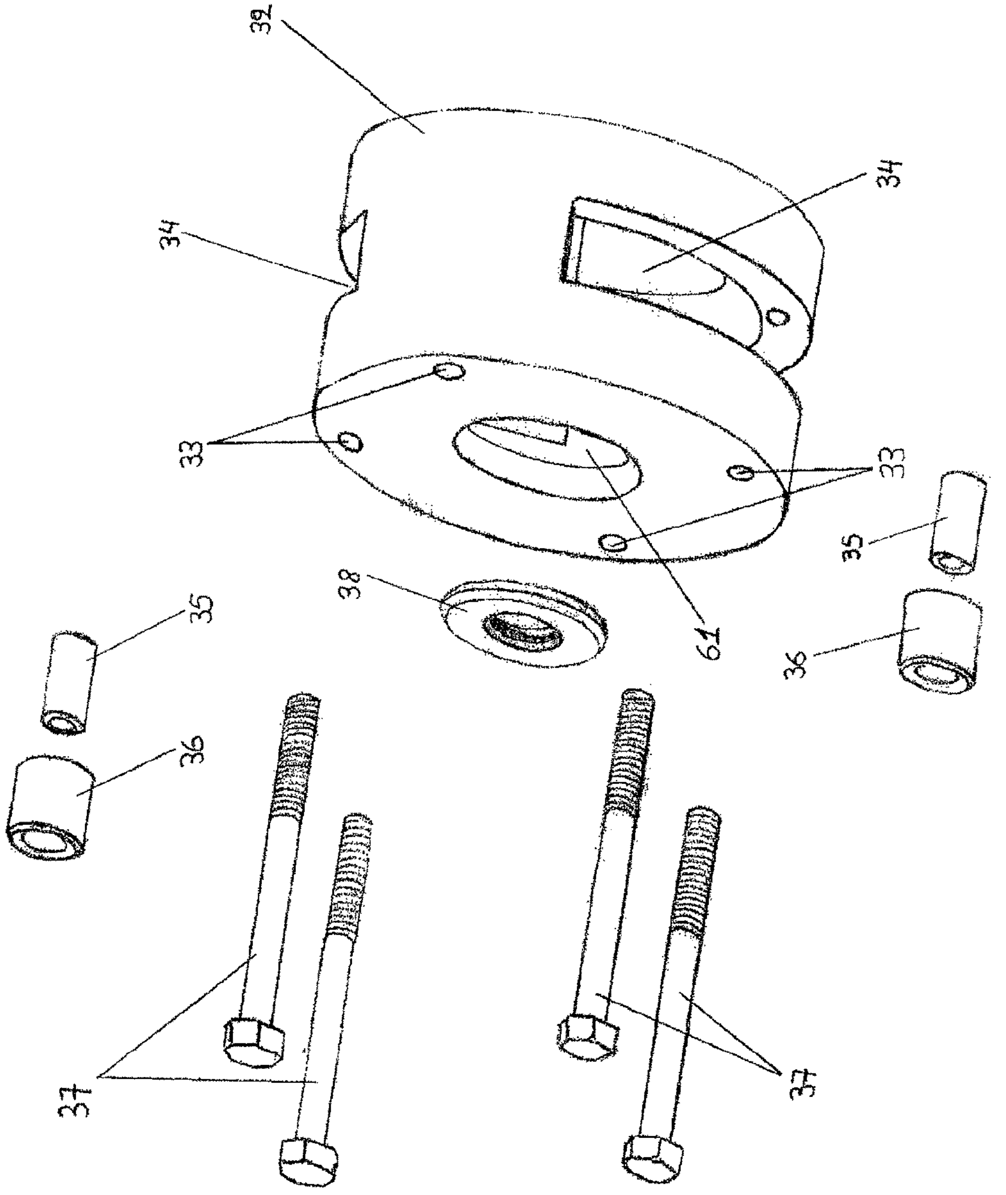

Each of FIGS. 3, 4, 5 shows an enlarged and expanded perspective view of certain fittings forming part of the entire device as shown in FIG. 2.

Figure 1:
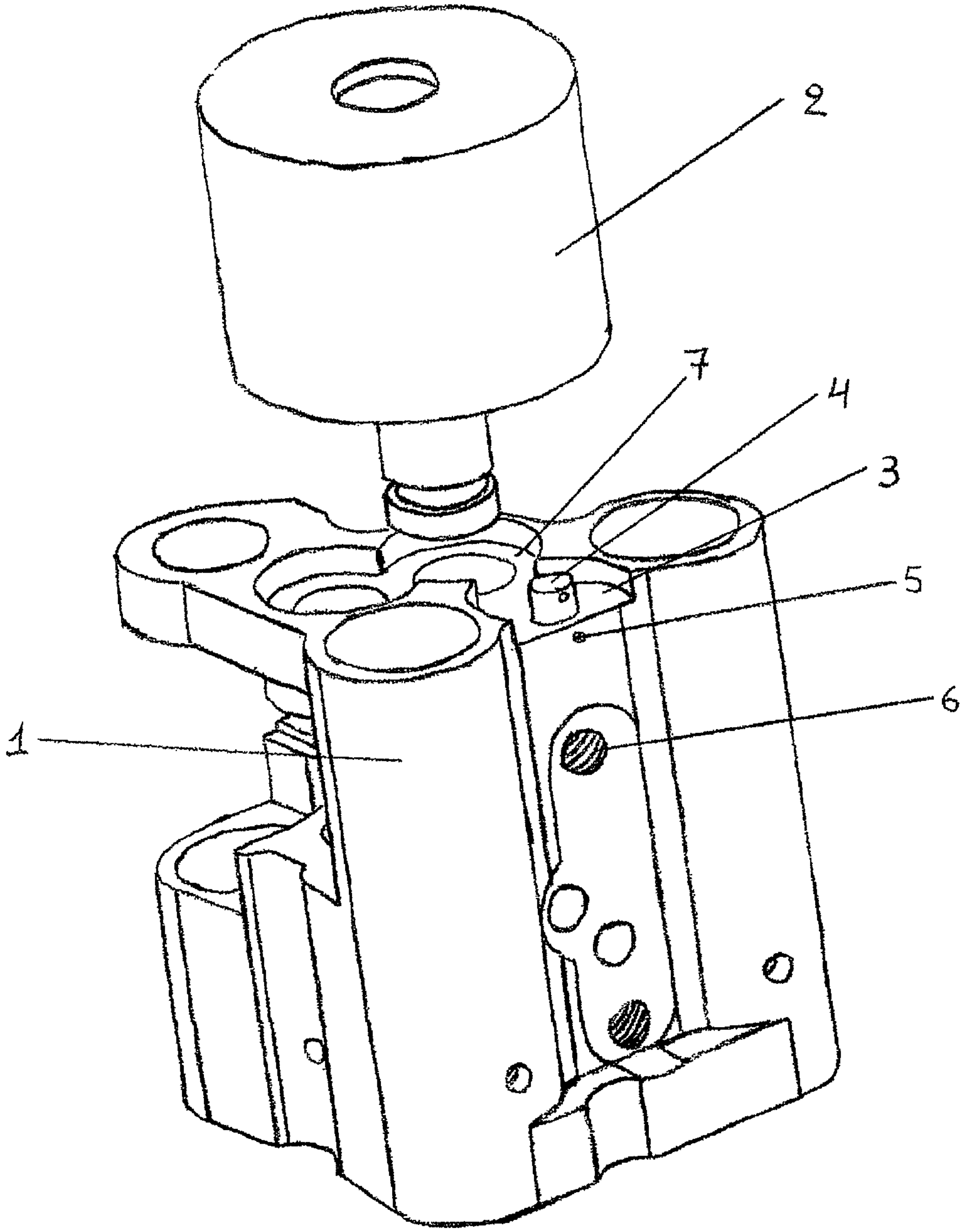
FIG. 1 shows a perspective view of an internal component called controlet (1) already present in a speed regulator on which the invention is applied and operates. The controlet (1) has been machined so that the over-acceleration protection device of the present invention can be connected and cooperate with it. It also shows a perspective view of another component already present in any speed regulator, known as counterweight carrier (2) or ballhead, with which the over-acceleration protection device is connected and cooperates.
Figure 6:
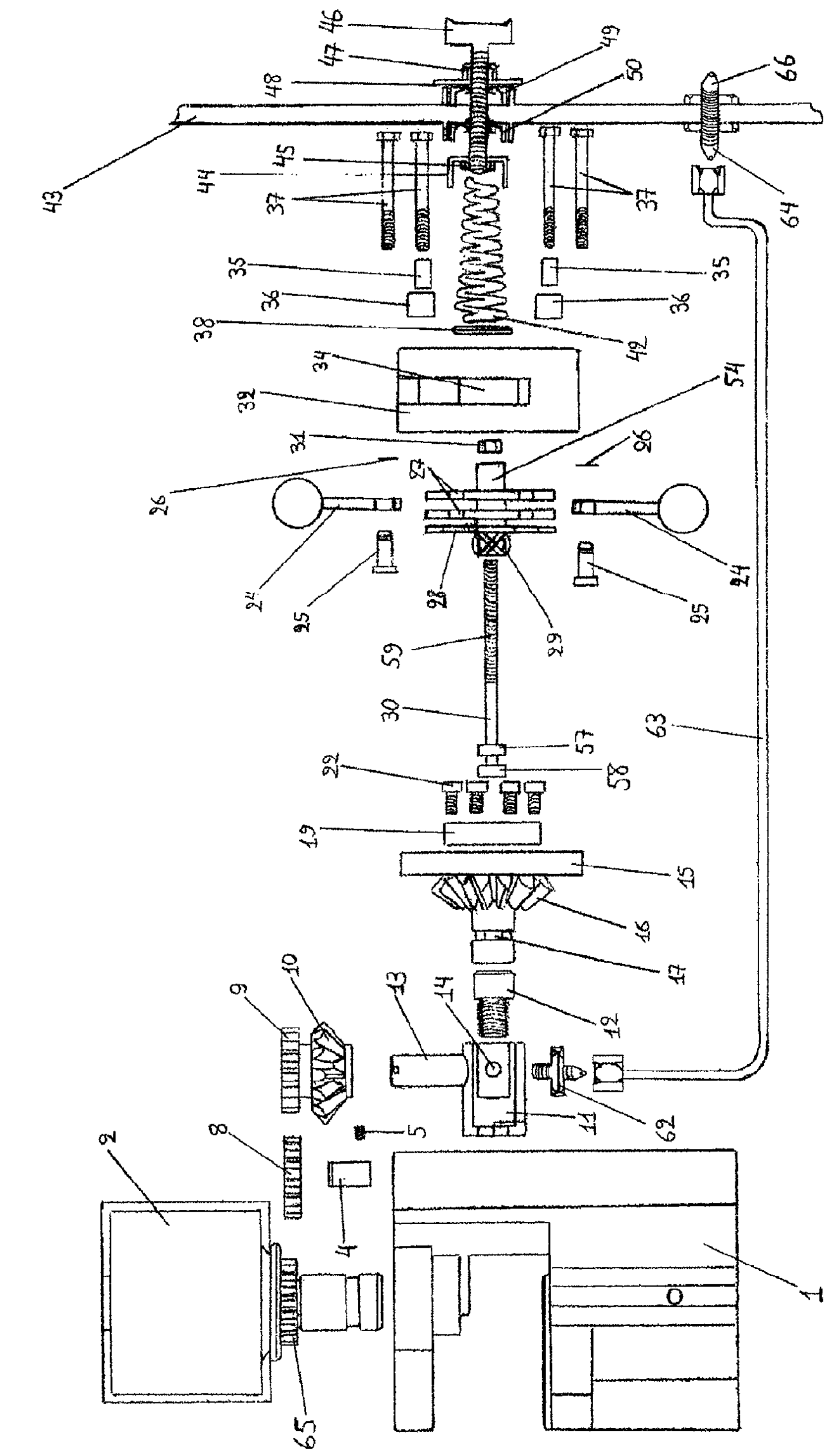

FIG. 6 shows an expanded side view of the entire structure, including the existing controlet components (1) and the counterweight carrier (2) as originally shown in FIG. 1. The metal lid (43) covering the device is also shown along with some accessories to adjust the revolutions over which the device will be activated.

Figure 7:
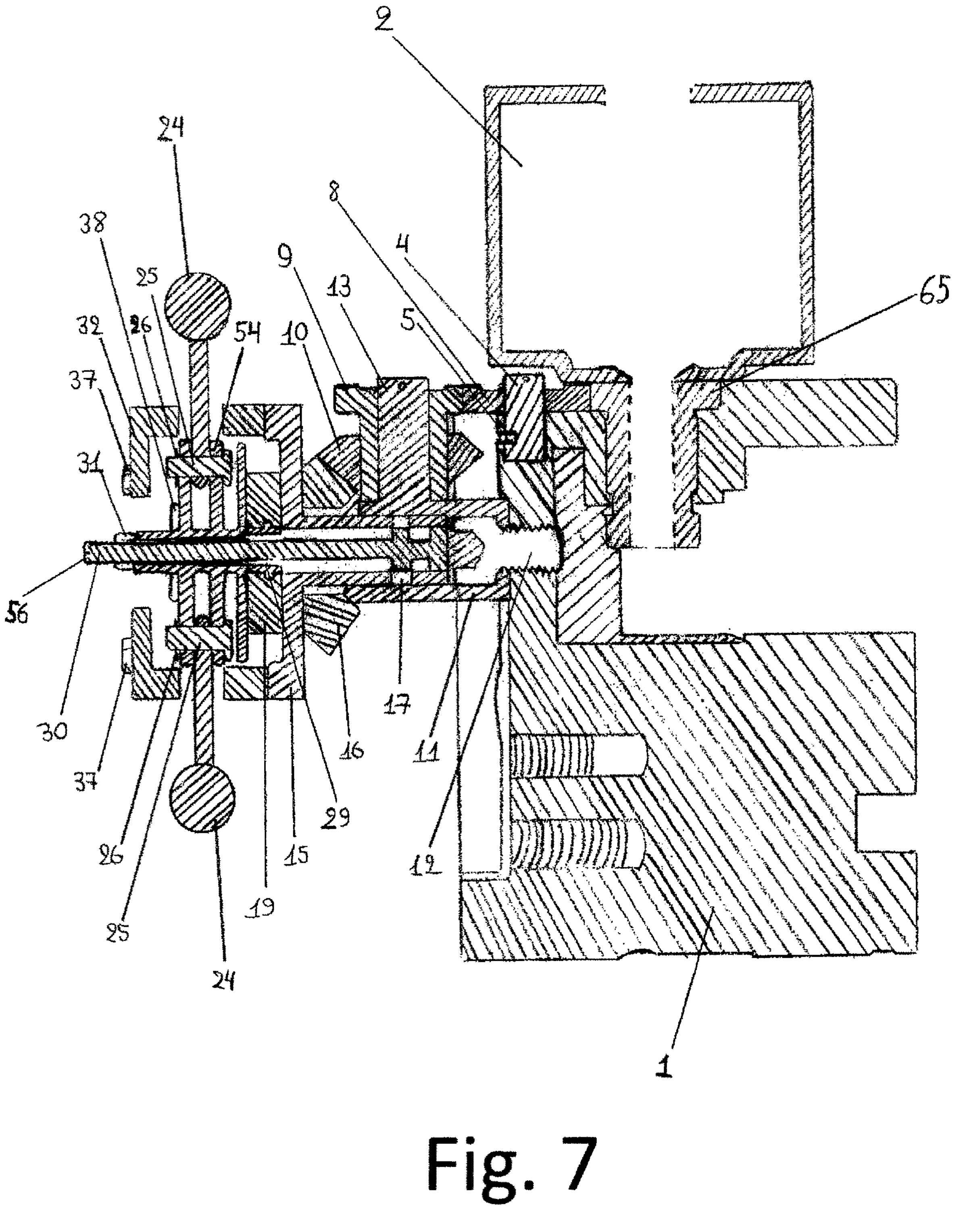

FIG. 7 shows a cross-section of the entire structure being fully assembled and attached to the existing controlet (1) and counterweight carrier (2) components.

Figure 8:
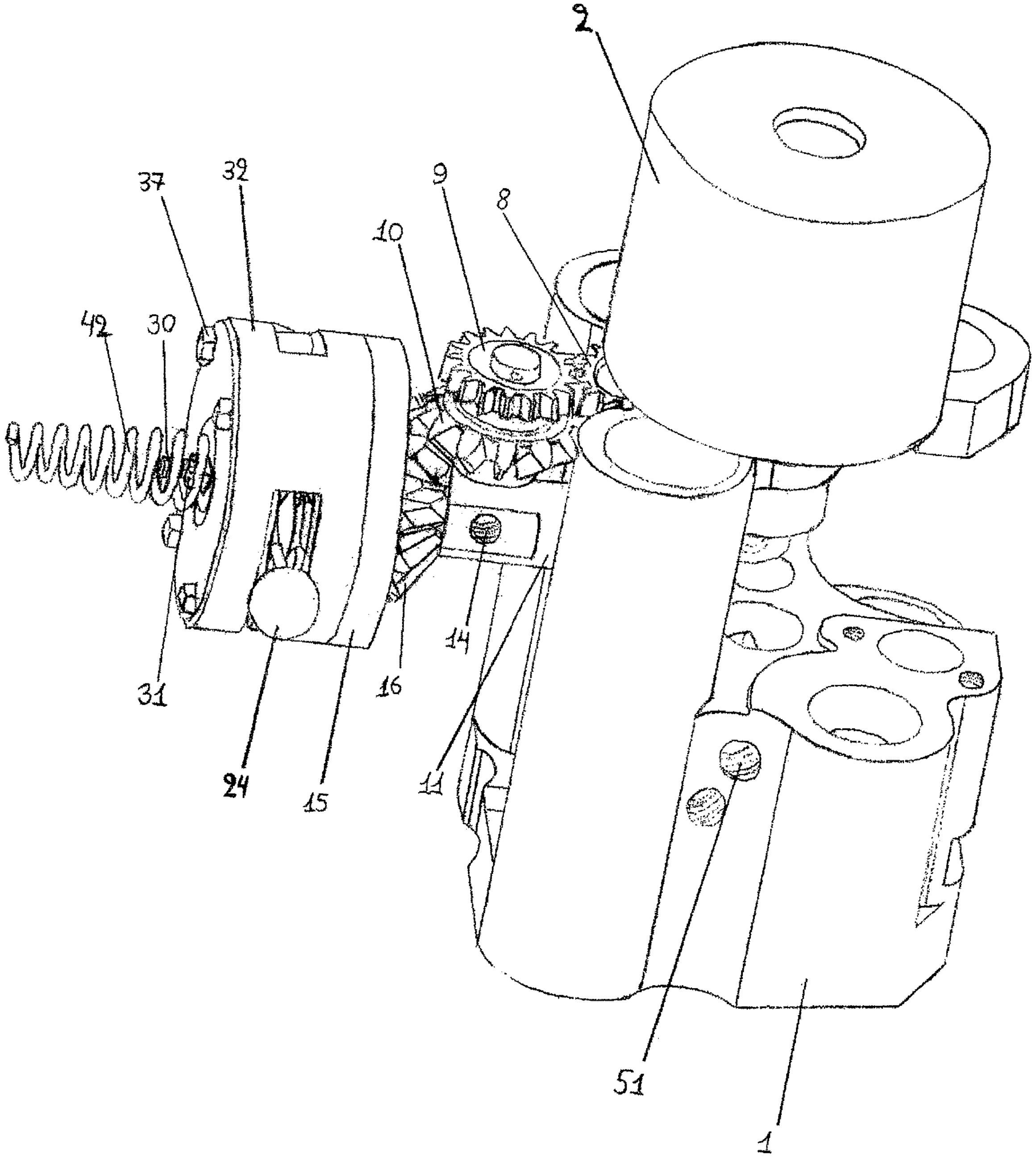

FIG. 8 shows a perspective view of the entire structure being fully assembled and attached to the existing components of the controlet (1) and the counterweight carrier (2).

Figure 9:
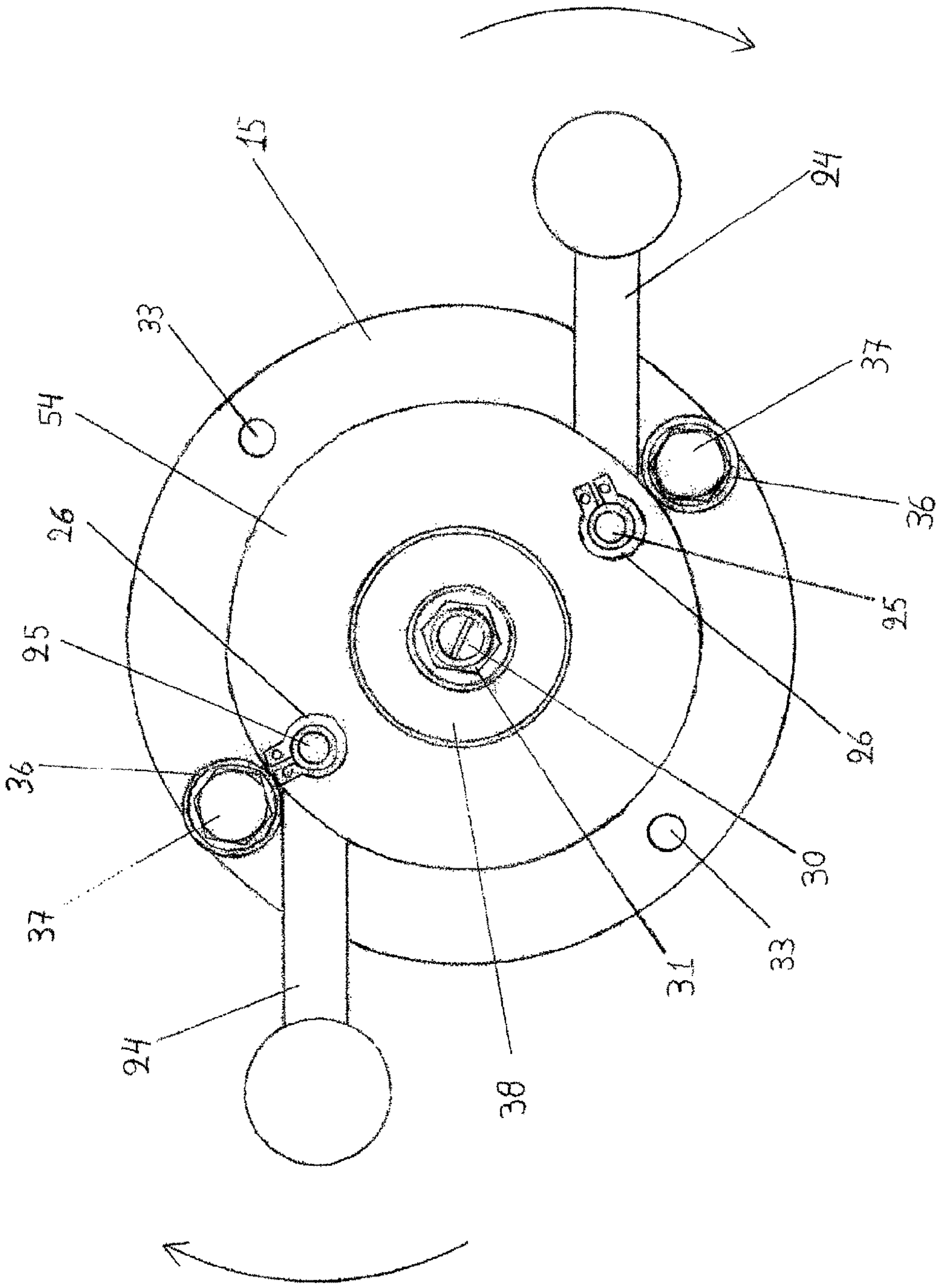

FIG. 9 shows a plan view of the bushing (bearing) (15) on which the weight carrier (54) is mounted. According to the drawing, it is better understood how the counterweight carrier (54) performs anticlockwise rotation when the counterweights (24) rotate clockwise with the bushing (15).

DETAILED DESCRIPTION OF THE INVENTION

To facilitate the reader, identical reference numbers are used to identify common elements in the figures where present.

More specifically in FIG. 1, the existing controlet (1) is shown into which the existing counterweight carrier (2) is inserted in such a way that its embedded gear wheel (65) as shown in FIG. 6 is positioned within the recess (7). The controlet (1) has been machined to have a recess (3) in which the pin (4) is positioned being secured to its position hole with the "allen" type screw (5). The fitting (11) (FIG. 2), due to its special construction, can be fixed completely perpendicular to the recess of the controlet (1) around the hole (6) (FIG. 1) and secured therein, using the allen type screw (12)

which passes through the hole (39) (FIG. 3) of the fitting (11) to get tightened into the hole (6) (FIG. 1).

As shown in FIG. 2, the gear wheel (8) is first mounted to the pin (4) (FIG. 1) and secured thereto by means of a clip. The screw (12) passes through the hole (39) (FIG. 3) of the fitting (11) and securely fastens it to the controlet (1) as mentioned above. Then, the double gear wheel (9), (10) is positioned on the pin (13) in such a way that the gear (9) teeth engage with the gear (8) teeth. Then, the double gear (9), (10) is secured using a clip. The component (15) is a bearing, also known in English terminology as bushing, with a built-in conical gear (16) and is mounted inside the fitting (11) so that the conical gear (16) teeth engage the teeth of the other conical gear (10) and on the other hand, the hole (17) is fully aligned with the hole (14) of the fitting (11). The washer (19) is inserted into the recess (52) of the bushing (15) as shown in FIG. 3 so that its holes (21) are aligned with the holes (40) of the bushing (15). Then, it is screwed thereto using the four screws (22) in such a way that the screw heads are fully inserted therein. Thus, as shown in the drawing, the upper surface (53) of the washer (19) remains flat. Also the washer (19) has a female helical thread (20) in its centre. Thereafter, the component (54), which is a counterweight carrier (ballhead), has a male helical screw thread (29) in the centre of one side corresponding to the thread (20) so that according to the drawing, it can be screwed fully in the thread (20), until the surface (23) of the component (54) rests on the surface (53) of the component (19). The weights (24) are positioned on the component (54) between the holes (27) (FIG. 4) in such a way that the weight holes (55) are aligned with the holes (27) of the counterweight carrier (54). The weights, according to the drawing, have an arm and a metal ball built onto their end. Then, the pins (25) which pass through the holes (28) which are larger than the holes (27) in order to allow passing both the shaft and the head of the pins (25), enter through the two holes (27) as well as the counterweight hole (55), achieving their connection. Horseshoe-shaped safety clips (26) are used to secure the pins (25). A plunger (30) passes through the centre of the counterweight carrier (54). For the most part, it consists of a male thread (59) which screws into the female thread (41) of the weight carrier (54). To screw or unscrew the plunger (30), a straight screwdriver is used which is positioned in its groove (56). The nut (31) secures the movement of the plunger (30) at the setpoint chosen by the engineer. Thus, in aggregate, the counterweight carrier (54) together with all the components shown in FIG. 4, as mentioned above, when screwed into the washer (19) directs the plunger into the bushing (15) hole (60). Depending on the adjustment made by the engineer by screwing or unscrewing the plunger (30), it causes a displacement of its piston portion (57), which in turn covers or uncovers the bushing (15) hole (17). The lid (32) is placed above said components so that its four holes (33) are aligned with the four holes (18) of the bushing (15) and then is screwed firmly thereto using the four screws (37). According to FIGS. 2, 5, two of the four screws (37) pass through the solid body of the lid (32) while the other two screws (37) pass vertically through two corresponding apertures (34) located one opposite to the other. The shaft of the two screws (37) passes through two small metal bushings (35) which act as sleeves and above them the two needle bearings (36) are placed. Finally, through the hole (61) of the lid (32) the thrust bearing (38) passes, which is mounted on the upper surface of the counterweight carrier (54).

According to FIG. 6, the pressure spring (42) also passes through the hole (61) of the lid (32) and rests with the thrust bearing. On the metal cover (43) of the over-acceleration protection device, two gaskets (49,50) are placed, internally and externally, to provide sealing and thus to prevent oil leakage from the interior of the speed regulator within which the acceleration protection device is located to the outside. A adjusting screw (46) passes through the two oil gaskets (49, 50), having at its tip a metal seat (44) secured by the nut (45). The rotary movement of the adjusting screw (46) is secured by the nut (47) which clamps onto the metal washer (48). The section of the over-acceleration protection device fully assembled as shown in FIG. 7, and also a perspective view thereof fully assembled as shown in FIG. 8, give us a better idea of its size and the layout of its components.

The two basic things that the present invention needs in order to be able to operate are, first, the rotary motion and secondly the supply of pressurized oil to its inlet. Rotational motion is needed because the invention is based on the phenomenon of centrifugal force and the supply of pressurized oil at its inlet is required because when the device is actuated, it provides this oil to its outlet, acting as a hydraulic trigger circuit either to activate the central holding device of the engine or turbine moving to an over-acceleration state, or to activate a separate holding device to be manufactured for the same purpose.

Regarding the supply of pressurized oil, the existing speed regulator oil is used, which from the first revolutions of the speed regulator and due to its oil pump, reaches its operating pressure of about 8-10 bar. In particular, the pressurized oil is provided, throughout the operation of the speed regulator, through the hole (51) (FIG. 8) of the existing controlet (1). This may be directed to the inlet of the hole (14) of the fitting (11), by means of a hermeto-type joint to be screwed into the hole (51), a pipe and another hermeto-type joint to be screwed into the hole (14), remaining there until the over-acceleration protection device is activated.

With respect to the necessary rotational motion, according to the invention and all the drawings as described above, when the drive shaft of the speed regulator starts to rotate from the ICE or turbine, it also causes the rotation of the existing counterweight carrier (2) (FIG. 1) whose gear (65) (FIG. 6) rotates the gear (8) which subsequently rotates the double gear component (9), (10) due to their connection. Thus, the gear (10) being engaged with the gear (16), and due to their conical construction, transfers its vertical rotational motion by ninety degrees to horizontal rotational motion of the bushing (15). Along with the bushing (15), all the other parts are rotated as shown in FIG. 2 because they are all attached thereto. Unlike the aforementioned rotary components, the pressure spring (42) (FIG. 6) resting upon the thrust bearing (38) remains stationary, since only the one side thrust bearing (38) washer resting on the counterweight carrier (54) rotates together with the other parts of the device while holding stationary the washer on its other side, i.e. where the pressure spring (42) rests, due to the small cylinders that are design incorporated between the two thrust bearing (38) washers. Throughout the normal operation of the speed regulator, the over-acceleration device, although it also rotates, is not activated because the piston portion (57) of the plunger (30) completely closes the hole (17) of the bushing (15) preventing communication of the two ends of the hole (14) of the fitting (11), because the holes (14) and (17) are structurally aligned. In order for this to happen in practice, when fitting the components, the engineer must, when the counterweight carrier (54) is fully screwed to the washer (19), adjust the position of the plunger (30) by screwing or unscrewing it using a straight screwdriver in its groove (56), achieving full coverage of the bushing (15) hole (17) by the piston portion (57) of the plunger (30). Then, the secures the adjustment carried out by tightening the nut (31). The diameter of the piston portion (57) of the valve (30) is made with great precision so that when entering the hole (60) of the bushing (15) it provides mechanical sealing. Also, the height of the piston portion (57) is slightly larger than the diameter of the hole (17), so that the engineer can perform the aforementioned adjustment with a slight safety tolerance.

According to the invention, the weights (24) during the rotation of the whole device tend to rotate to the same direction due to the centrifugal force. Also because of their design, a part of their shaft and the embedded metal ball on their end come out of the lid (32) passing through the openings (34) and having as centre of rotation the hole (55) through which the pins (25) pass. Also because of their length, their movement stops when their shaft rests on the needle bearings (36) which remain firmly fixed to the apertures (34) of the lid (32) by using the two screws (37) and metal bushings (35). The vertical force exerted by the pressure spring (42) maintains the surface (23) of the counterweight carrier (54) in contact with the surface (53) of the washer (19) and thus the male helical thread (29) is fully screwed into the respective female helical thread (20). The pressure exerted by the spring (42) depends on the position of the adjusting screw (46). The more this is pressed by the adjusting screw (46), the more force it exerts on the thrust bearing (38), so the higher centrifugal force is needed to be applied to the weights (24), so the higher rotational speed is needed to rotate them and eventually all the acceleration protection device so that they can overcome the pressure spring resistance (42).

The over-acceleration protection device is activated when the revs of the ICE or turbine uncontrollably increase to an over-acceleration state. According to FIG. 9, if we assume that the entire over-acceleration protection device rotates clockwise, then the counterweights (24) will also rotate to the same direction. Then, as mentioned above, the counterweight shafts abut against the needle bearings (36) and act as levers while the needle bearings (36) act as fulcrums. Under these conditions, due to the increased centrifugal force as a result of the over-acceleration state of the ICE or the turbine, when the end of the counterweights (24) with the incorporated metal ball rotates clockwise and forms an imaginary clockwise arc, as shown in the figure, this movement will cause the other end, i.e. the hole (55), to rotate anticlockwise, also forming an imaginary arc. Thus, due to the fact that the weights (24) are connected to the weight carrier (54) by using the pins (25), they will cause a anticlockwise rotation of the weight carrier (54) overcoming the vertical resistance of the pressure spring (42), simultaneously causing the clockwise male helical thread (29) to be unscrewed from the respective clockwise female helical thread (20) of the washer (19). As a result, the counterweight carrier (54) is lifted a few millimetres from the washer (19) while simultaneously dragging the plunger (30) at an axial displacement of a few millimetres from its original position. As a result, the piston portions (57), (58) of the valve (30) are positioned before and after the opening (14) of the fitting (11), allowing their intermediate portion having a smaller diameter to align with it and the two ends of the hole (14) to communicate with each other. Then, the residual pressurized oil drained to one end of the hole (14) as mentioned above, finds a way out to the other end of the hole (14) and thus passing through the nozzle (62) (FIG. 6), through the tube (63) (FIG. 6) and nozzles (64.66) (FIG. 6), can be used, through an outer tube, to actuate the central ICE or turbine holding system or another independent holding system, stopping immediately the uncontrolled operation thereof.

It is worth noting that the device operation described above relates to the case of clockwise rotation. If the over-acceleration protection device is caused to rotate anticlockwise as a result of rotation of the drive shaft of the speed regulator and the existing counterweight carrier (2), then both the washer (19) and the counterweight carrier must have a anticlockwise (female (20) and male (29), respectively) helical thread (20) for the device to operate normally. Conversely, if anticlockwise threads are used in the components (19), (54) for a clockwise rotating device, then actuating the device will cause screwing and not unscrewing resulting in non-displacement of the plunger (30) and thus non-activation of the device.

Finally, the over-acceleration protection device for an ICE or turbine speed regulator as described above is constructively fitted to all of the Woodward UG-5.7/8/10/15 speed regulators, wherein by using both different hardness pressure springs (42) and anticlockwise or clockwise helical threads (20), (29) on the components (19), (54) of the device respectively, its correct and uninterrupted operation is ensured for the full range of over acceleration speeds of all different models of the aforementioned speed regulators and for all different codes of these models.

The invention claimed is:

1. An over-acceleration protection device on an internal combustion engine (ICE) or turbines, comprising a first gear wheel which is connected to and transmits rotational motion of said first gear wheel to a second gear wheel, the second gear wheel having a first conical gear connected below said second gear wheel and rotatably secured to a pin of an existing fitting, wherein said pin is fixedly secured to said existing fitting and the first conical gear is rotatably secured to the pin using a first allen type screw;

a bushing having a second conical gear integrally secured thereto, a bushing hole along a free end of the bushing, and a plunger hole along a recess opposite to the free end, wherein the bushing is inserted into and rotatably secured within a hole of said existing fitting so that the hole of said existing fitting and the bushing hole of said bushing are aligned with each other;

a washer secured within the recess of said bushing using a plurality of second allen type screws, said washer having a female helical thread in a center of the washer;

a counterweight carrier having a male helical thread and a plurality of counterweights permanently connected thereon using a plurality of pins and a plurality of safety clips said counterweight carrier also carries, the counterweight carrier secured to the bushing via the male helical thread fastening to the female helical thread;

a longitudinally extending plunger valve having a piston portion along a first free end, the plunger valve extending through the counterweight carrier and the bushing such that the piston portion fully covers the bushing hole;

a lid secured to said bushing using a set of four screws, whereby the lid and said bushing encase said counterweight carrier, while at the same time at least one counterweight of said plurality of counterweights of the counterweight carrier extends out of each of two peripheral openings of said lid as the protection device rotates, wherein two screws of the set of four screws each extend through a corresponding peripheral hole of the two peripheral holes of the lid, and a spacer and a needle bearing are each coaxially secured about each of the two screws in the corresponding peripheral hole such that the needle bearing is secured directly around the spacer which is secured directly around a corresponding screw, each counterweight of said plurality of counterweights resting firmly on the needle bearing;

a thrust bearing mounted on said counterweight carrier and on a pressure spring, a pressure of said pressure spring adjusted by a position of an adjusting screw, wherein said adjusting screw is secured by an adjusting screw nut, and wherein the protection device relies on a centrifugal force effect such that the protection device is activated when a force causes said counterweights to rotate during operation of the ICE or the protection device is uncontrolled and within a limit of over-acceleration revolutions.

2. The over-acceleration protection device according to claim 1, wherein the protection device receives pressurized oil of a speed regulator at an inlet of the speed regulator and when activated, the speed regulator again returns the pressurized oil to an oil outlet, passing through said hole of said existing fitting, through a plurality of nozzles via a tube, in order to activate a protection device shutdown system.

3. The over-acceleration protection device according to claim 1, wherein said plurality of counterweights act as levers and each needle bearing acts as a fulcrum so that when the protection device rotates, said plurality of counterweights rest on each of said plurality of needle bearings and forms an imaginary arc in a direction of rotation, and an imaginary arc of reverse direction of rotation at an opposing end of said plurality of needle bearings causing unscrewing of said counterweight carrier and consequently axial displacement of said plunger valve.

4. The over-acceleration protection device according to claim 1, wherein said female helical thread of said washer and said male helical thread of said counterweight carrier are made with a pitch such that during full movement of said plurality of counterweights, when the protection device is actuated, said female helical thread and said male helical thread can unfasten from each other to achieve necessary axial displacement of said plunger valve to fully uncover said plunger hole of said bushing from the piston portion.

5. The over-acceleration protection device according to claim 1, wherein both said female helical thread of said washer and said male helical thread of said counterweight carrier may be either counterclockwise or clockwise made, depending on whether the protection device rotates in a counterclockwise or clockwise direction respectively, so that when the protection device is activated, said female helical thread and said male helical thread can unscrew each other and axially displace said plunger valve from said hole of said existing fitting and the plunger hole of said bushing to communicate between them.

6. The over-acceleration protection device according to claim 1, further comprising using one or more of said pressure spring, wherein each said one or more pressure spring is of different hardness and length and based on a path that said adjusting screw can make.

7. The over-acceleration protection device according to claim 1, wherein said protection device, when fully assembled, can be fitted to speed regulators by making slight mechanical conversion to the existing components of the speed regulators.

8. The over-acceleration protection device according to claim 1, wherein the protection device is set in rotation as soon as the ICE or turbine speed regulator begins to rotate due to the mechanical connection to an existing gear of the speed regulator.

9. The over-acceleration protection device according to claim 1, wherein components of the protection device are metallic and manufacturing tolerances of some components are too small to allow mechanical sealing between them.

* * * * *